United States Patent
Andrén (10) Patent No.: US 7,860,638 B2
(45) Date of Patent: Dec. 28, 2010

(54) METHOD FOR DETERMINING FUEL INJECTION PRESSURE

(75) Inventor: Magnus Andrén, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 438 days.

(21) Appl. No.: 12/095,177

(22) PCT Filed: Dec. 6, 2005

(86) PCT No.: PCT/SE2005/001853

§ 371 (c)(1),
(2), (4) Date: May 28, 2008

(87) PCT Pub. No.: WO2007/067102

PCT Pub. Date: Jun. 14, 2007

(65) Prior Publication Data

US 2008/0294326 A1     Nov. 27, 2008

(51) Int. Cl.
*G06F 19/00*     (2006.01)
*G06F 11/30*     (2006.01)
*G01L 5/26*     (2006.01)
*F02M 65/00*     (2006.01)

(52) U.S. Cl. .................. 701/114; 701/102; 701/111; 702/185; 73/114.43; 73/114.51

(58) Field of Classification Search ......... 123/434–436, 123/445, 446, 458–460, 495, 497, 498, 500–509; 701/101–105, 110, 111, 114, 115; 73/114.38, 73/114.41, 114.43, 114.51; 702/50, 182, 702/183, 185, FOR. 143
See application file for complete search history.

(56) References Cited

U.S. PATENT DOCUMENTS 4,602,604 A * 7/1986 Kauer .................... 123/508
5,094,215 A * 3/1992 Gustafson ................ 123/500
5,235,939 A    8/1993 Levin et al.
5,483,937 A * 1/1996 Firey ...................... 123/435

(Continued)

FOREIGN PATENT DOCUMENTS

EP     0849438 A1    6/1998

(Continued)

OTHER PUBLICATIONS

International Search Report from corresponding International Application No. PCT/SE2005/001853.

(Continued)

*Primary Examiner*—Willis R Wolfe, Jr.
(74) *Attorney, Agent, or Firm*—WRB-IP LLP (57) ABSTRACT

A method for determining fuel injection pressure or detecting a discrepancy in the fuel injection process of an internal combustion engine is provided. The engine includes a camshaft that actuates at least one fuel injector of the engine's fuel injection equipment. The method includes the step of determining a value T that is representative of the torque generated on the camshaft, such as the instantaneous torque or rotational speed of the camshaft, the torque being a resultant of accelerating and decelerating forces exerted on the camshaft by the at least one fuel injector during a phase of operation of the internal combustion engine. The method also includes the step of monitoring the value T for any increment, decrement or irregularity.

24 Claims, 4 Drawing Sheets

U.S. PATENT DOCUMENTS 7,113,861 B2 * 9/2006 Jacobson .................... 701/101
2001/0018846 A1 9/2001 Shin

FOREIGN PATENT DOCUMENTS

| GB | 2082266 A | 3/1982 |
|---|---|---|
| GB | 2104157 A | 3/1983 |
| JP | 10176592 A * | 6/1998 |

OTHER PUBLICATIONS

International Preliminary Report on Patentability from corresponding International Application No. PCT/SE2005/001853.

* cited by examiner

METHOD FOR DETERMINING FUEL INJECTION PRESSURE

BACKGROUND AND SUMMARY

The present invention concerns a method for determining fuel injection pressure or detecting a discrepancy in the fuel injection equipment of an internal combustion engine.

Fuel injection equipment is used in an internal combustion engine to deliver fuel and aid in proper intake gas/fuel mixture formation. Fuel is reduced to a fine spray and injected directly into the cylinder(s) of the internal-combustion engine. Injecting fuel in a correct way is important for maintaining efficient combustion, good fuel economy and low pollutant emissions. Problems such as clogging, wear and leakage of the fuel injectors of fuel injection equipment are difficult to detect and it is time consuming and costly to disassemble fuel injection equipment to check whether it is operating correctly.

It is desirable to provide a method for determining fuel injection pressure or detecting a discrepancy in the fuel injection process of an internal combustion engine, said engine comprising at least one camshaft that actuates at least one fuel injector via a rocker arm for example.

A method according to an aspect of the present invention comprises the step of determining, i.e. measuring or calculating, a value T that is representative of the torque generated on the camshaft. The value T is the instantaneous torque or rotational speed of the camshaft for example and said torque is in part a resultant of accelerating and decelerating forces exerted on the camshaft by said at least one fuel injector during a phase of operation of said internal combustion engine. The method also comprises the step of monitoring the value T i.e. determining at least one value T, so as to detect any increment, decrement or irregularity since said at least one value should correspond to the torque of a newly manufactured or tuned engine if the fuel injection equipment is operating correctly.

A fault or an irregularity in the function of fuel injection equipment will result in a diminished, increased or irregular torque being generated on the camshaft since the energy being used for injecting fuel is proportional to the mechanical energy transmitted by the camshaft. Injection pressure builds up in a fuel injector prior to fuel being ejected from the fuel injector into one or more cylinders of the internal combustion engine. As the pressure in a fuel injector increases a decelerating force is exerted on the camshaft, causing the camshaft to decelerate. Once fuel is ejected from the fuel injector, the pressure inside the fuel injector decreases and the energy in the drive system is released, causing the camshaft to accelerate.

According to an embodiment of the invention the method comprises the step of using the value T to determine whether the forces exerted by said at least one fuel injector on the camshaft correspond to a predetermined value indicative of correct operation of fuel injection equipment.

According to an embodiment of the invention said predetermined value is a reference value $T_{ref}$ being representative of the torque on the camshaft when said at least one fuel injector is operating correctly. An ideal torque may be established for certain engine conditions. Comparing the determined torque (i.e. the measured or calculated T value) with the ideal torque gives an indication of whether the fuel injection equipment of an internal combustion engine fulfils the desired requirements.

According to another embodiment of the invention the method comprises the step of providing the camshaft, or a component arranged to be brought to rotate with the camshaft, with at least one rotational reference, such as a groove or tooth, and sensing the passage of said at least one rotational reference in order to measure the rotational speed of the camshaft.

In the case of an engine having more than one fuel injector the T-value profile, i.e. camshaft speed/torque profile, will include peaks whose maxima correspond to the release of fuel from each fuel injector. By determining or plotting a value T as a function of camshaft rotational angle it is possible to determine which fuel injector is injecting fuel into the cylinder(s) of the internal combustion engine at a given camshaft rotational angle since the firing order of the cylinders of the engine is known and since a particular fuel injector injects fuel into a particular cylinder or particular cylinders. An individual T-value may therefore be assigned to each of the fuel injectors. The inventive method may thereby not only be used to indicate whether there is a fault with one or more fuel injectors of an internal combustion engine but it can also be used to indicate exactly which fuel injector(s) is/are at fault, which facilitates repair and maintenance work.

According to a further embodiment of the invention of the value T is determined constantly or at one or more rotational angles of the camshaft. For example, a plurality of T-values, such as maximum or minimum T-values, may be determined during at least part of one complete rotation of the camshaft or during a number of rotations. According to an embodiment of the invention the torque (T-value) may be measured or calculated at regular or irregular intervals during the use of the internal combustion engine and logged to provide information concerning the fuel injection equipment's performance with time. When the internal combustion engine is serviced the log may be studied to ascertain whether the fuel injection equipment is in need of any repair work.

According to an embodiment of the invention, the value T is determined by producing a speed vector including values being representative of instantaneous speeds of the camshaft during a sampling period of said phase of operation of said internal combustion engine, determining a mean camshaft speed n during said sampling period from the speed vector, determining a value $P_x$ being representative of the frequency contribution of the speed vector at the frequency x*n, where x is a pre-selected order and producing said value T being representative of the torque on the camshaft during said sampling period, wherein T is derived from a mathematical expression including a polynomial having at least a term $k*n*P_x$, wherein k is a polynomial constant.

This provides a useful measure of the torque that has the advantage of being applicable to situations in which an internal combustion engine is in use, for example when a vehicle containing said internal combustion engine is under load i.e. during normal driving conditions. It also has the advantage that it is executable using a relatively low number of samples and using relatively few calculations, which means that calculations can be made rapidly without requiring unreasonable processor capacity, storage space, etc.

According to another embodiment of the invention the expression includes the polynomial: $k0+k1*P_x+k2*n+k3*n*P_x$, wherein k0, k1, k2 and k3 are polynomial constants, and advantageously $T=k0+k1*P_x+k2*n+k3*n*P_x$. According to a further embodiment of the invention the selected order x may be equal to the number of cylinders of the engine or the number of cylinders divided by two. This selection of the order has been found to reflect the effect of a four-stroke engine particularly well. It should be noted that the invention is applicable to an internal combustion engine having any number of cylinders and camshafts.

According to a yet further embodiment of the invention, the sampling period corresponds to at least 10 revolutions of the engine. Such a sampling period is long enough to ensure that the torque value includes the effect of all of the injectors of the engine.

According to an embodiment of the invention the speed vector comprises values t being representative of instantaneous speeds of the camshaft being the passages of time between subsequent rotational references, such as one or more identical or non-identical teeth, grooves or markings, arranged in connection with the camshaft i.e. provided directly on the camshaft or on a component that is brought to rotate directly with the camshaft. The instantaneous change of speed of the rotational references in front of a sensor corresponds to the measurement of instantaneous torque on the camshaft. This embodiment provides an efficient and relatively reliable method for calculating values being representative of instantaneous camshaft speeds.

According to an embodiment of the invention the arrangement of a plurality of rotational references is irregular at some locations. In such an embodiment, the method may comprise a compensation step when generating the speed vector, wherein effects of any irregularities in the arrangement of the rotational references are compensated for. The rotational references may however be regularly spaced around the circumference of the camshaft or the component on which they are arranged.

According to another embodiment of the invention, the value $P_x$ representing the torque contribution for the frequency $x*n$ is determined using a Fourier series analysis of the speed vector. In this case, the speed vector should preferably include at least 500 samples so as to give satisfactory resolution.

Alternatively, the value $P_x$ may be determined using a Fast Fourier Transform for the phase-amplitude transformation of the speed vector. In this case, the RMS value of the area under the peak at the frequency $n*x$ in the phase-amplitude transformation is used as $P_x$. If Fast Fourier Transform is used in combination with selecting the RMS value of the xth order peak as $P_x$, it has been found that good results are obtained when the speed vector includes at least 1000 samples, preferably at least 2000 samples.

Regardless of the phase-amplitude transform method used, the values t, i.e. the Δ-time between two rotational references, may advantageously be sampled with a sample interval with a duration of less than or equal to 10 microseconds, preferably less than or equal to 1 microsecond.

The present invention also concerns a computer program product comprising a computer program containing computer program code means arranged to cause a computer or processor to execute at least one of the steps of a method according to any of the embodiments of the invention stored on a computer-readable medium or a carrier wave. Furthermore the present invention relates to an electronic control unit (ECU) comprising said computer program product. According to an embodiment of the invention the ECU is arranged to provide an audible, visual or readable signal or warning to a user, such as the driver of a vehicle/vessel comprising the inventive internal combustion engine, on detection of a fault in the engine's fuel injection equipment. Visual or audible signals may for example be used to alert a driver or mechanic to a serious fault with an engine's fuel injection equipment immediately while a readable signal may be used to log information concerning minor faults so that this information can be read when the internal combustion engine is being serviced or tuned.

According to another embodiment of the invention the ECU is arranged to control the fuel injectors of fuel injection equipment in such a way as to minimize the force fluctuations exerted on the camshaft by the fuel injectors, for example by opening and/or closing the fuel injector valves rapidly so that the resultant forces exerted on the camshaft are balanced, which consequently eliminates or minimizes the vibrations and noise generated by the fuel injectors. Whenever a roller follower on a cam lobe passes the maximum lift point of a fuel injector plunger, or in case of large pressure fluctuations in the fuel injector, the forces on cam drive gear teeth may change direction and such a directional change of force results in an audible click due to the backlash between the cam and pinion gear. The inventive method is suitable for detecting the injection of fuel into a cylinder of an internal combustion engine and it can consequently be used to predict when a fuel injector will exert an accelerating or decelerating force on a camshaft. The method can therefore be used to predict the occurrence of noise and vibrations arising as a result of such accelerating and decelerating forces. Preventive measures, such as timing the opening and closing of fuel injector valves so as to minimise the magnitude of the forces exerted on the camshaft by the fuel injectors, may therefore be taken to minimise noise and vibrations.

The present invention further concerns a vehicle, such as a car, truck, heavy duty vehicle or a tracked vehicle comprising an ECU according to any of the embodiments of the invention.

BRIEF DESCRIPTION OF THE DRAWINGS

Other advantages of the invention will become more apparent in the description of a particular embodiment of a method according to the invention given below as a non limiting example with reference to the appended drawings, in which.

DETAILED DESCRIPTION

Figure 1:
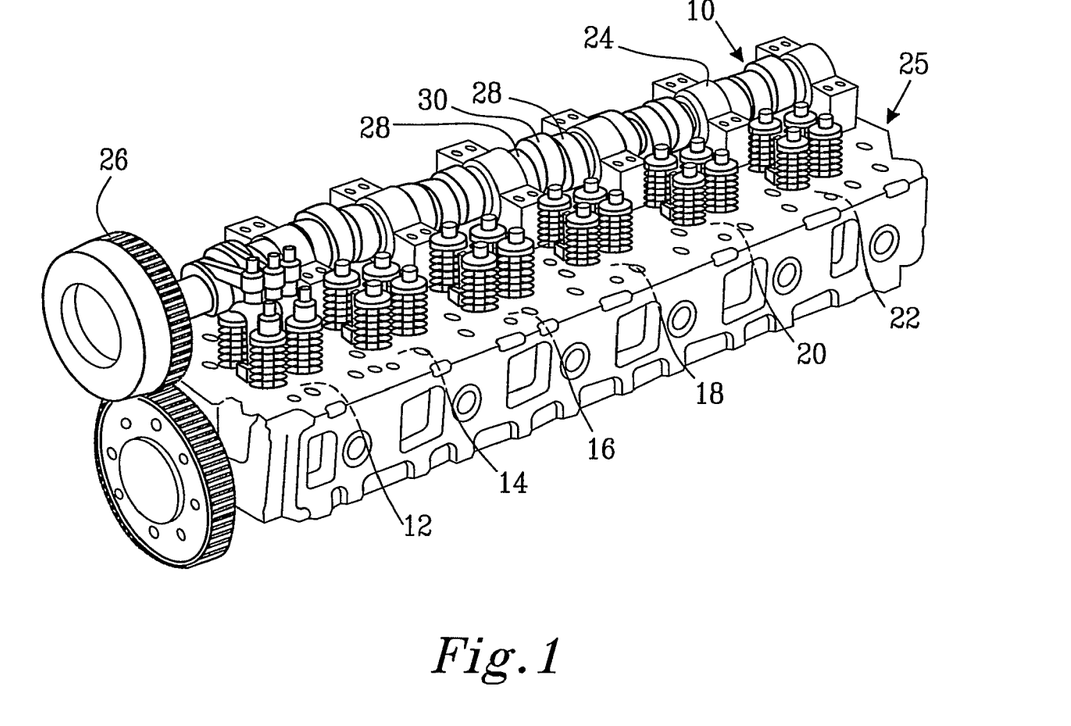
FIG. 1 shows schematically the camshaft and cylinder head of a six cylinder four stroke internal combustion engine.
Figure 2:
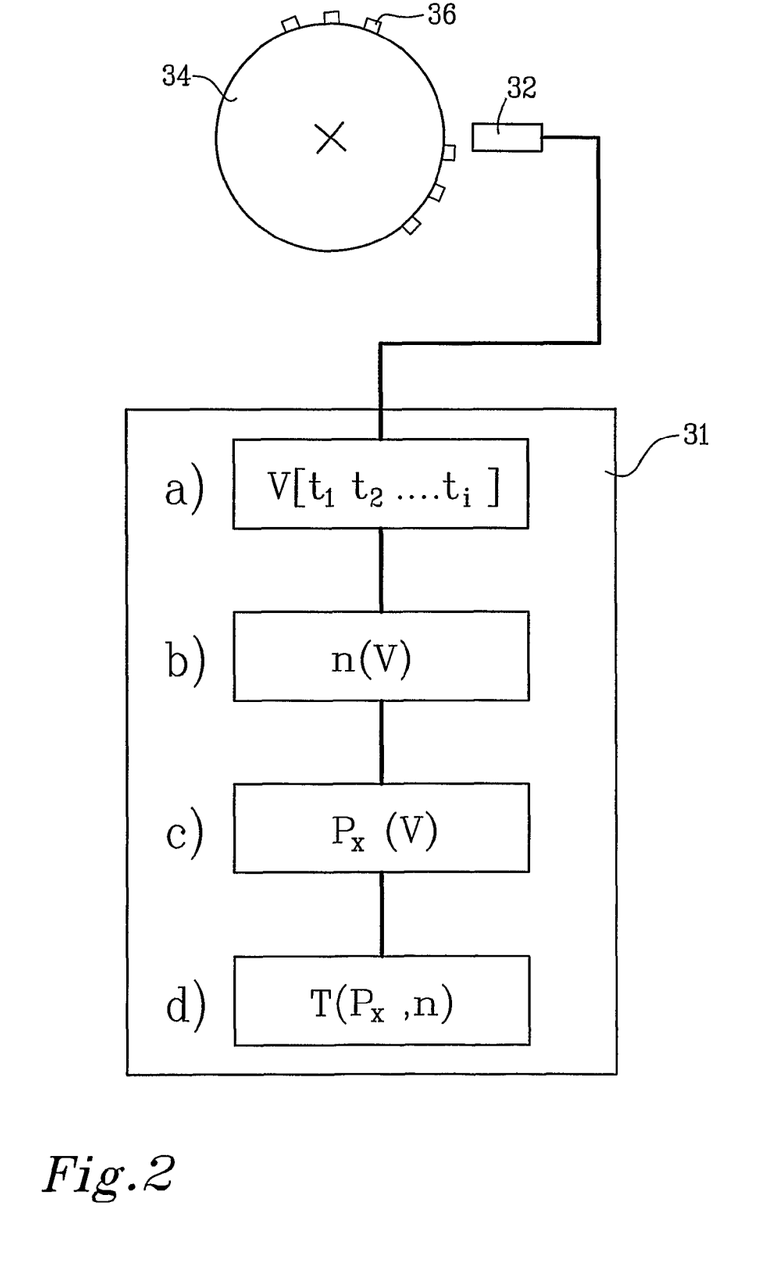
FIG. 2 illustrates schematically an embodiment of a method according to an embodiment of the invention.

FIG. 1 shows schematically a camshaft 10 of four stroke internal combustion engine having six cylinders 12,14,16,18, 20,22. The camshaft 10 is mounted in slide bearings 24 on the upper surface of the cylinder head 25. The camshaft 10 is driven off a crankshaft (not shown) through a gear transmission 26 and rotates at one half of engine speed in the illustrated embodiment. The camshaft 10 comprises three cam lobes per cylinder; two of the cam lobes 28 control valves and the third cam lobe 30 controls a fuel injector of the fuel injection system. Fuel is supplied to each of the cylinders 12,14,16,18,20,22. FIG. 2 schematically illustrates an embodiment of a method according to the invention. A sensor 32 is used for sensing the passage of subsequent references 36 in the form of teeth provided on a component 34, such as a flange, that is mounted on the camshaft 10 of a combustion engine. The instantaneous value of the period of passage of the teeth 36 in front of the sensor 32 corresponds to the measurement of instantaneous speeds of the camshaft. A signal generated by the sensor 32 is transmitted to calculation means, such as a computer or microprocessor, which uses that information to calculate the torque generated on the camshaft.

The sensor 32 is for example adapted to measure the passage of references 36 at sample intervals having a duration of 1 microsecond, being equal to a frequency of 1 MHz since it has been found that a frequency of 1 MHz or more gives particularly good results using the inventive method.

The values t provided by the sensor 32 corresponding to the passages of time between subsequent rotational references 36 are then used as representative values of instantaneous speeds of the camshaft to form a speed vector V in a method step a).

As illustrated in FIG. 2, the references 36 may be irregularly arranged, so that there are gaps between the references at certain points around the circumference of the component 34 on which they are arranged. The values of the speed vector V are corrected for the missing references by calculating the mean value for the missing references and the next reference, and replacing all of the relevant values with a mean value.

In method step b) the mean camshaft speed n during the sampling period is calculated from the speed vector V, and expressed in revolutions/second.

In method step c), the speed vector V is used to produce a phase-amplitude representation, in which the value $P_x$, being representative of the torque contribution at a selected frequency x*n, is calculated.

According to an embodiment of the invention, the method selected to determine the amplitude $P_x$ is a Fourier series of sines and cosines. However, other Fourier transform methods may also be useful. Nevertheless, it has been found that the sine and cosine method provides useful results without the need of an excessive number of samples or calculation capacity.

The sine and cosine method is a true phase-amplitude transformation only when all orders are included. In this case, all orders need not to be included, since it is sufficient to know the amplitude for the order x. The result is a linear equation system that may be solved in least square sense.

The linear equation system to be solved in the sine cosine method can be written as $[A] \times [C] = [V]$, where [V] is the speed vector including f values v1, v2 . . . , vf measured at regular angular intervals over two revolutions of the engine crankshaft and [A] is a sine and cosine matrix (f×(2j+1)). The equation is solved for [C] which includes the constants $a_0, a_1, b_1, a_2, b_2 \ldots a_k, b_k$ for a Fourier series.

$$f(t) = \frac{1}{2}a_0 + \sum_{k=1}^{j} a_k \sin(k\Omega t) + b_k \cos(k\Omega t), \ \Omega = 2\pi/T$$

Since f(t) is periodic with period T=2π:

$$f(t) = \frac{1}{2}a_0 + \sum_{k=1}^{j} a_k \sin(kt) + b_k \cos(kt)$$

so that the first column of the A matrix is a column of ones, to take care of the initial constant term. (This term is not needed if the average n is subtracted from the values of the V-vector before calculation.) The next column is sine of order one, and thereafter follows cosine of order one. The following columns are sine and cosine for a third, a fourth cycle etc.

$$A = \begin{bmatrix} 1 & \sin(\pi) & \cos(\pi) & \sin(2\pi) & \ldots & \cos(k2\pi) \\ 1 & \sin(\pi/2) & \cos(\pi/2) & \sin(2\pi/2) & & \ldots \\ \ldots & \ldots & \ldots & \ldots & \ldots & \ldots \\ 1 & \sin(\pi/f) & \cos(\pi/f) & \sin(2\pi/f) & \ldots & \cos(k2\pi/f) \end{bmatrix}$$

$$C = \begin{bmatrix} a_0/2 \\ a_1 \\ b_1 \\ a_2 \\ b_2 \\ \ldots \\ \ldots \\ a_k \\ b_k \end{bmatrix} \quad V = \begin{bmatrix} t_1 \\ t_2 \\ \ldots \\ \ldots \\ t_f \end{bmatrix}$$

The equation system is solved, giving the sine and cosine coefficients $a_x$ and $b_x$ for the selected xth order, that is the phase $x_n$. Knowing $a_x$ and $b_x$, the amplitude is given by Pythagoras theorem: $(P_x)^2 = a_x^2 + b_x^2$.

The necessary length of the measured speed vector V depends on the method used for calculating $P_x$ in the following method step, and of the accuracy wanted in the resulting torque value T. If $P_x$ is calculated using FFT analysis, a suitable vector length might be about 2000 samples. If $P_x$ instead is calculated using a sine and cosine transform, the length of the vector may be considerably shortened, to about 600 samples.

Finally, in method step d), the value T being representative of the torque is derived from T=k0+k1*P3+k2*n+k3*n*P3, where k0, k1, k2 and k3 all are polynomial constants being stored in a suitable memory.

If a Fast Fourier Transform FFT method is used instead of the sine and cosine method as described above, the amplitude Px of the amplitude-phase diagram corresponding to the frequency f=x*n, where x is the selected order must be calculated. This may advantageously be made from a plot of the FFT transform, and calculating the RMS value of the area of the peak at the relevant frequency, which corresponds to the amplitude $P_x$. Using the amplitude the RMS value of the area of the peak in a FFT transform, or using the amplitude from the sine and cosine method as $P_x$, will result in different polynomial coefficients k0, . . . , k3. Nevertheless, both methods will provide accurate results. It has been found that the FFT method requires more samples in order to achieve sufficient accuracy than the sine and cosine method. The value T may be calculated regularly during the use of the internal combustion engine and stored in a log for possible evaluation when the engine is being serviced or in particular if a user suspects that something is wrong with the fuel injection equipment. Alternatively, the value T may be used when assessing the function of newly manufactured engines to ensure that the engine torque attains the desired specifications. In both instances, the value T may be compared to a reference value $T_{ref}$ being determined by measuring or calculating T for a number of reference engines.

The polynomial parameters k0, k1, k2 and k3 need to be determined for different situations. Engines may be constructed in groups, each group containing engines having the same torque behaviour and using the same polynomial constants. For determining the polynomial parameters, the actual torque T may be measured and compared to the mathematical expression of T at a number of measurement points being sufficient to set up an equation system from which the values of the constants may be derived.

In the illustrated embodiment any or all of the method steps a)-d) may be carried out in an electronic control unit (ECU) 31.

Figure 3:
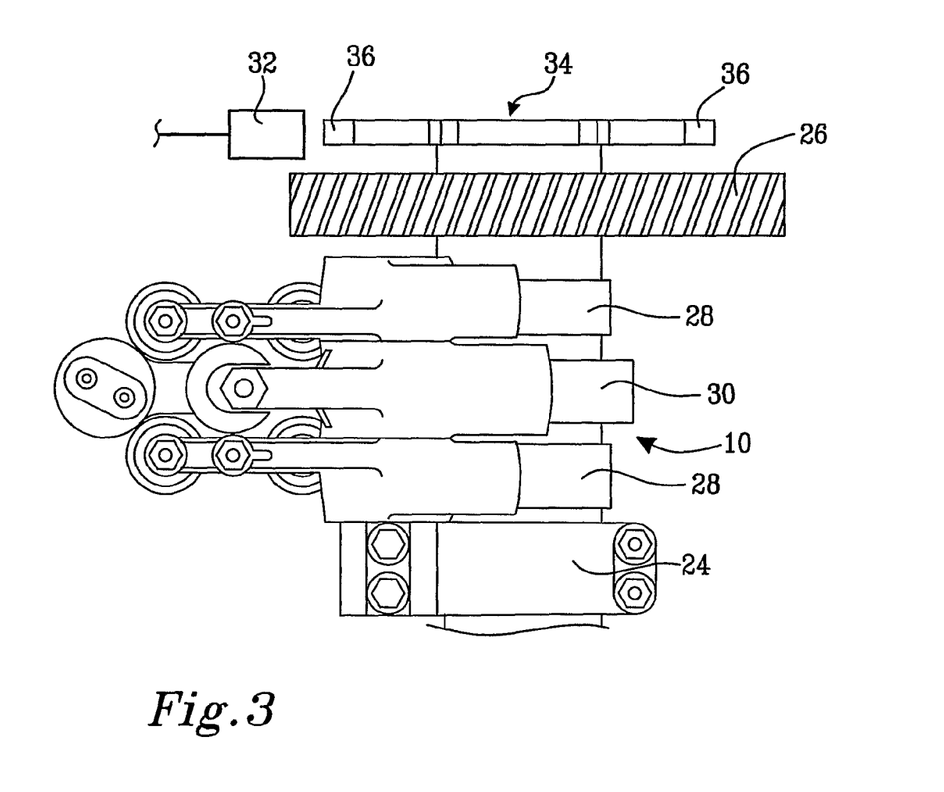
FIG. 3 shows schematically a plan view of part of a camshaft according to an embodiment of the invention.

FIG. 3 depicts a flange 34 comprising a plurality of teeth 36 on its outer peripheral surface is mounted on the camshaft. A sensor 32 is used for sensing the passage of subsequent teeth 36. Such an arrangement may be used to determine the rotational angle and speed of the camshaft 10.

Figure 4:
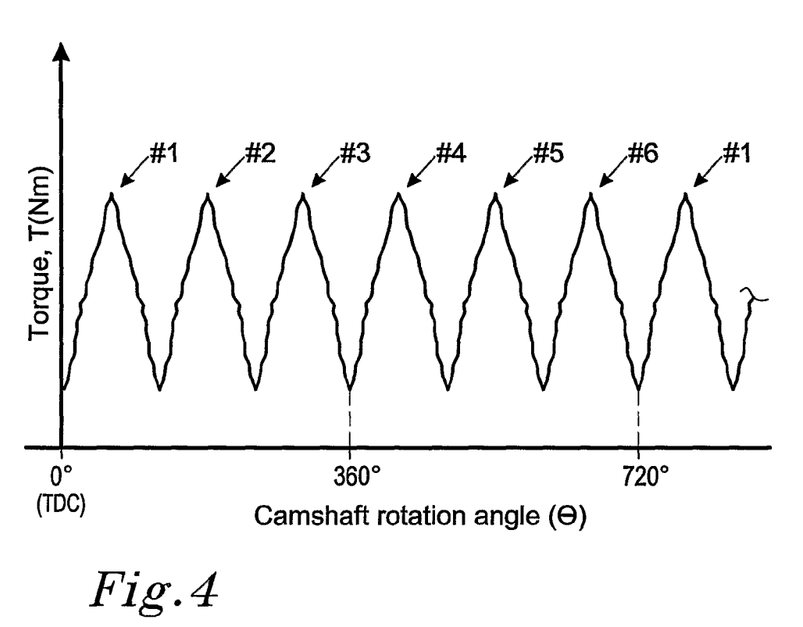
FIG. 4 is a graph showing the torque generated on the camshaft of a six cylinder internal combustion engine.

FIG. 4 is a typical measured torque (T-value) on the camshaft of a six cylinder engine comprising fuel injection equipment having six fuel injectors where each cylinder is associated with one fuel injector that supplies fuel thereto. The torque is shown as a function of the rotational angle of the camshaft from TDC. As each fuel injector ejects fuel into the engine's cylinders the torque on the camshaft increases, peaks and then decreases. Since the firing order of the cylinders of the engine is known and since fuel is injected into each cylinder from a particular fuel injector prior to firing a cylinder, each torque peak in the graph of measured torque can be assigned to a particular fuel injector. The maximum torque assigned to the fifth fuel injector #5 can then be compared to a reference value $T_{ref}$ to check whether said fuel injector #5 of the fuel injection equipment is operating correctly. Measuring the torque on the camshaft instead of the crankshaft of an internal combustion engine eliminates the influence of other events/systems on combustion efficiency and therefore on measured torque values. It should be noted that the inventive method is also applicable to internal combustion engines in which one fuel injector supplies more than one cylinder with fuel.

Further modifications of the invention within the scope of the claims would be apparent to a skilled person. For example even though a camshaft comprising three lobes per cylinder for the actuation of valves and fuel injectors has been exemplified in the detailed description of embodiments of the invention, the invention is applicable to a camshaft having any number of lobes, or lobes per cylinder, for the actuation of valves and fuel injectors or for the actuation of fuel injectors only.

The invention claimed is:

1. A method for at least one of determining fuel injection pressure and detecting a discrepancy in a fuel injection process of an internal combustion engine, the engine comprising a camshaft that actuates at least one fuel injector of the fuel injection equipment of the engine, wherein the method comprises the steps of:
   determining a value T that is representative of torque generated on the camshaft, the torque being a resultant of accelerating and decelerating forces exerted on the camshaft by the at least one fuel injector during a phase of operation of the internal combustion engine, and
   monitoring the value T for at least one of a increment, decrement and irregularity.

2. A method according to claim 1, comprising providing at least one of the camshaft and a component arranged to be brought to rotate with the camshaft with at least one rotational reference, and sensing passage of the at least one rotational reference in order to determine rotational speed of the camshaft.

3. A method according to claim 1, wherein the fuel injection equipment of the internal combustion engine comprises a plurality of fuel injectors and that the value T is determined at least one of constantly and at one or more rotational angles of the camshaft in order to determine whether a particular fuel injector is operating correctly.

4. A method according to claim 1, comprising using the value T to determine whether the forces exerted by the at least one fuel injector on the camshaft correspond to a predetermined value indicative of correct operation of fuel injection equipment.

5. A method according to claim 4, wherein the predetermined value is a reference value $T_{ref}$ representative of torque of an engine in which the at least one fuel injector is operating correctly.

6. A method according to claim 1, wherein the value T is determined by producing a speed vector including representative values of instantaneous speeds of the camshaft during a sampling period of the phase of operation of the internal combustion engine, determining a mean camshaft speed n during the sampling period from the speed vector, determining a value $P_x$ being representative of the frequency contribution of the speed vector at the frequency x*n, where x is a pre-selected order, and producing the value T being representative of the torque on the camshaft during the sampling period wherein T is derived from a mathematical expression including a polynomial having at least a term $k*n*P_x$, wherein k is a polynomial constant.

7. A method according to claim 6, wherein the value T is derived from a mathematical expression including the polynomial: $k0+k1*P_x+k2*n+k3*n*P_x$, where k0, k1, k2 and k3 are polynomial constants.

8. A method according to claim 6, wherein $T=k0+k1*P_x+k2*n+k3*n*P_x$, where k0, k1, k2 and k3 are polynomial constants.

9. A method according to claim 6, wherein the selected order x is equal to one half of a number of cylinders of the engine.

10. A method according to claim 6, wherein the internal combustion engine is a two-stroke engine, and the selected order x is equal to a number of cylinders.

11. A method according to claim 6, wherein the sampling period corresponds to at least 10 revolutions of the engine.

12. A method according to claim 6, wherein the value $P_x$ representing torque contribution for the frequency x*n is determined using a Fourier series analysis of the speed vector.

13. A method according to claim 6, wherein the values t are sampled with a sample interval with a duration of less than or equal to 10 microseconds.

14. A method according to claim 6, wherein the speed vector comprises values t being representative of instantaneous speeds of the camshaft being the passages of time between subsequent rotational references arranged in connection with a camshaft of the combustion engine.

15. A method according to claim 14, comprising a compensation step when generating the speed vector, wherein effects of any irregularities in an arrangement of the rotational references are compensated for.

16. A method according to claim 6, wherein the value Px representing torque contribution for the frequency x*n is determined using phase-amplitude transformation of the speed vector.

17. A method according to claim 16, wherein the amplitude $P_x$ is determined solving an equation system: $[A]\times[C]=[V]$, wherein V is a speed vector containing f samples, and A is a matrix for k orders $$A = \begin{bmatrix} 1 & \sin(\pi) & \cos(\pi) & \sin(2\pi) & \ldots & \cos(k2\pi) \\ 1 & \sin(\pi/2) & \cos(\pi/2) & \sin(2\pi/2) & & \ldots \\ \ldots & \ldots & \ldots & \ldots & \ldots & \ldots \\ 1 & \sin(\pi/f) & \cos(\pi/f) & \sin(2\pi/f) & \ldots & \cos(k2\pi/f) \end{bmatrix}$$

$$C = \begin{bmatrix} a_0/2 \\ a_1 \\ b_1 \\ a_2 \\ b_2 \\ \ldots \\ \ldots \\ a_k \\ b_k \end{bmatrix} \quad V = \begin{bmatrix} t_1 \\ t_2 \\ \ldots \\ \ldots \\ t_f \end{bmatrix}$$

for the coefficients $a_x$ and $b_x$ of the pre-selected order x, and obtaining the amplitude $P_x = \sqrt{a_x^2 + b_x^2}$.

18. A method according to claim 6, wherein the value $P_x$ is determined by using a Fast Fourier Transform for a phase-amplitude transformation of the speed vector.

19. A method according to claim 18, wherein $P_x$ is determined by plotting the Fast Fourier Transform of the speed vector and determining an RMS value of the area under a peak at the frequency x*n.

20. A computer program product, comprising a computer program containing computer program code means arranged to cause a computer or a processor to execute at least one of the steps of a method according to claim 1, stored on a computer-readable medium.

21. An electronic control unit, comprising a computer program product according to claim 20.

22. An electronic control unit according to claim 21, arranged to provide at least one of an audible, visual or readable signal on detection of a fault in the fuel injection equipment of an internal combustion engine.

23. An electronic control unit according to claim 21 is arranged to control at least one fuel injector of fuel injection equipment in such a way as to minimise the forces exerted on a camshaft of the internal combustion engine by the fuel injectors in order to minimize noise and vibration generated by the at least one fuel injector.

24. A vehicle comprising an Electronic control unit according to claim 21.

* * * * *